United States Patent [19]

Bortz et al.

[11] Patent Number: 4,518,172
[45] Date of Patent: May 21, 1985

[54] ENERGY-DISSIPATINGLY FLEXIBLE KNEE-RESTRAINING ELEMENT

[75] Inventors: Botho Bortz, Wolfsburg; Erwin Wulfes, Gifhorn, both of Fed. Rep. of Germany

[73] Assignee: Volkswagenwerk Aktiengesellschaft, Wolfsburg, Fed. Rep. of Germany

[21] Appl. No.: 438,704

[22] Filed: Nov. 3, 1982

[30] Foreign Application Priority Data

Dec. 23, 1981 [DE] Fed. Rep. of Germany ....... 3150964

[51] Int. Cl.³ .............................................. B60R 21/04
[52] U.S. Cl. ..................................... 280/751; 180/90; 296/37.12
[58] Field of Search ............... 280/752, 751, 753, 748; 296/37.12 P, 70; 180/90; D12/192

[56] References Cited

U.S. PATENT DOCUMENTS

| 2,375,567 | 5/1945 | Luton | 280/752 |
| 3,386,765 | 6/1968 | Drach | 296/37.12 |
| 4,368,901 | 1/1983 | Kojima | 280/751 |
| 4,427,215 | 1/1984 | Weichenrieder | 280/752 |

FOREIGN PATENT DOCUMENTS

| 3010817 | 10/1980 | Fed. Rep. of Germany . |
| 3029913 | 2/1982 | Fed. Rep. of Germany . |
| 2516027 | 5/1983 | France ................................. 296/70 |

Primary Examiner—Joseph F. Peters, Jr.
Assistant Examiner—Joseph G. McCarthy
Attorney, Agent, or Firm—Brumbaugh, Graves, Donohue & Raymond

[57] ABSTRACT

The invention relates to an energy-dissipating flexible knee-restraining element for vehicles, in particular passenger automobiles, comprising a hollow profiled beam extending in the transverse direction of the vehicle and located below the instrument panel. In accordance with the invention, the arrangement is provided, at least on the front passenger side, with a cut-out surrounded by a rigid molded frame, which cut-out is covered by a pivoting flap designed as an energy-dissipating flexible hollow profile element having a storage compartment with an open top end affixed to its rear side opposite the passenger compartment. When the flap is pivoted into the open position, the compartment is readily accessible to the passenger.

5 Claims, 3 Drawing Figures

4,518,172

ENERGY-DISSIPATINGLY FLEXIBLE KNEE-RESTRAINING ELEMENT

BACKGROUND OF THE INVENTION

The invention relates to a flexible, energy-dissipating knee-restraining element for vehicles, and in particular, to a knee-restraining element which is installed beneath the instrument panel of a passenger automobile.

Knee-restraining elements are known. German Offenlegungsschrift No. 23 35 958 describes such an element. The known arrangements are used to restrain movement of the lower body of a passenger in the event of an emergency, particularly in vehicles which provide a safety belt, such as a shoulder belt for restraining only the upper body.

In these known arrangements, the knee-restraining element comprises a hollow beam which extends without interruption over the width of the vehicle, and is typically secured to the vehicle body at both of its ends. A disadvantage of these known arrangements is that space ordinarily allotted for storage, such as a glove box, is occupied by the knee-restraining element. Thus, a glove box or similar storage space cannot be provided.

SUMMARY OF THE INVENTION

Accordingly, it is an object of the present invention to provide an energy-dissipating knee-restraining element which does not suffer from the aforementioned drawback and which, while ensuring the protection of the passengers' lower body, still offers a storage capacity.

These, and other objects of the invention as will become apparent, are accomplished in accordance with the present invention by providing a hollow profile beam which comprises on the operator side of the vehicle an inner and an outer plate, the outer plate being covered with a rigid expanded plastics covering.

On the passenger side of the vehicle, the hollow profile beam has a rectangular cut-out area surrounded by a rigid, non-deforming frame. The cut-out area is covered by a pivoting flap which, similar to the operator's side, comprises an inner and an outer plate, the outer plate being covered by a suitable rigid expanded plastics covering.

The back wall of the inner plate of the pivoting flap has affixed thereto a container which is opened at its upper end. When the pivoting flap is closed, the flap presents a flush surface with the remainder of the knee-restraining element. When opened, the interior storage space of the container is readily accessible to the vehicle passenger.

The inner and outer plates, and the container, may comprise steel or aluminum plate, or a suitable plastic.

BRIEF DESCRIPTION OF THE DRAWINGS

The invention, the scope of which will be pointed out in the appended claims, will now be described in greater detail by reference to the attached drawings, in which:

DESCRIPTION OF EXEMPLARY EMBODIMENT

Figure 1:
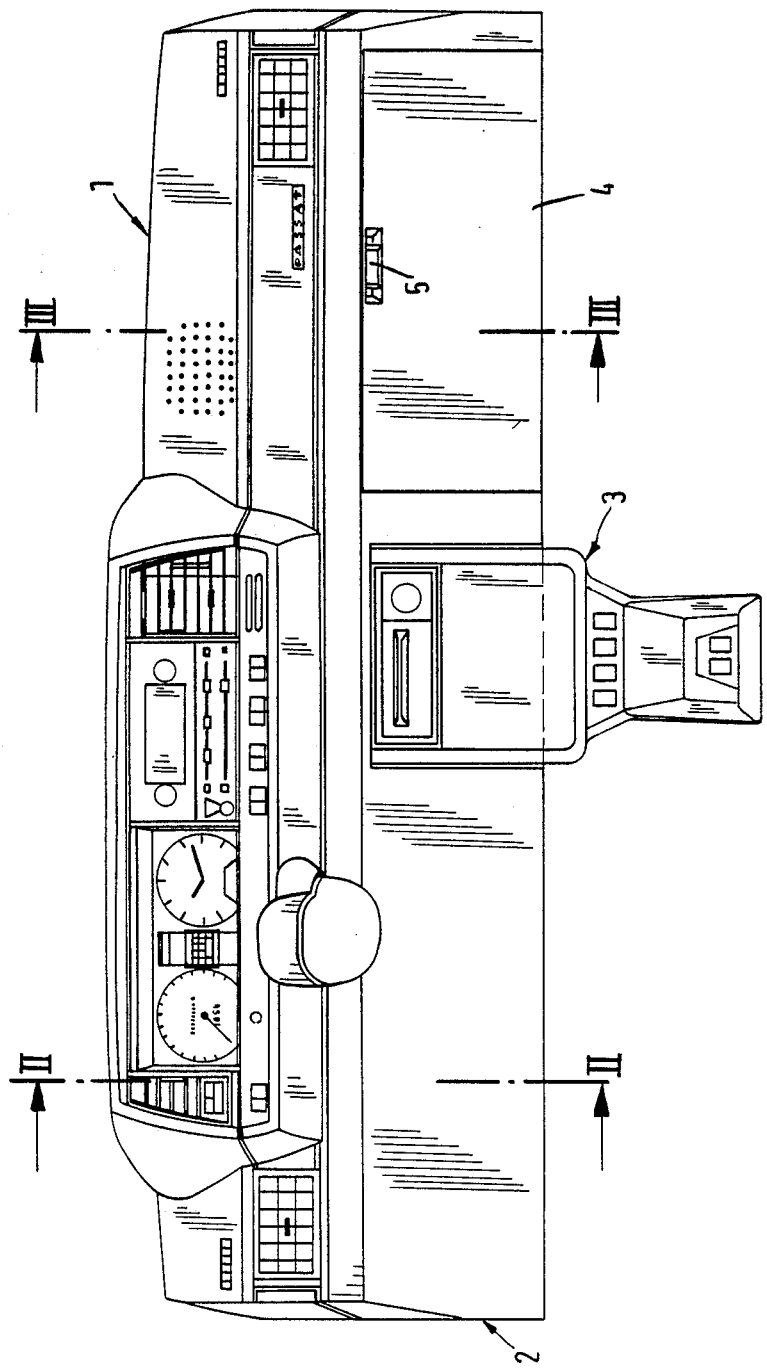
FIG. 1 is a view of the instrument panel of a passenger automobile embodying the knee-restraining element of the present invention, as seen from within the passenger compartment.

With reference to the drawings, and in particular to FIG. 1, the knee-restraining element 2 of the present invention is shown in its position beneath an instrument panel 1 of a passenger vehicle. In the center of the vehicle, the knee-restraining element 2 is interrupted by a console 3, and to the right of the console is provided with a pivoting flap 4. The flap 4 is opened and closed by means of an actuating mechanism 5.

Figure 2:
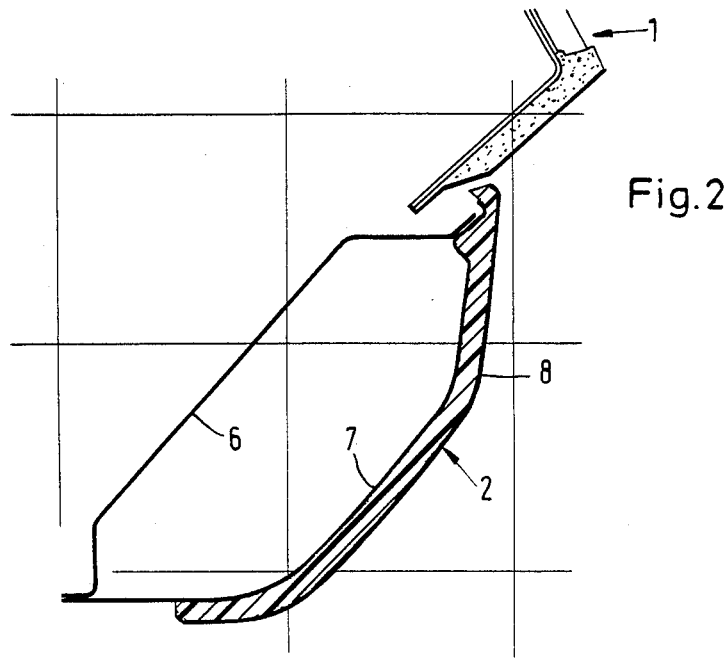
FIG. 2 is a cross-sectional view taken along the line II—II in FIG. 1.

Referring to FIG. 2, the knee-restraining element on the vehicle operator's side, to the left of the console 3, comprises an essentially hollow profiled beam, open at its end face. The beam comprises a relatively rigid inner plate 6 and an outer plate 7 which curves over the inner plate 6. The side of the outer plate 7 facing the passenger compartment is provided with a rigid expanded plastics covering 8.

On the passenger side of the vehicle, to the right of the console 3, the essentially hollow profiled beam is provided with a rigid molded frame 10 which surrounds a rectangular (as illustrated) cut-out 9. The frame 10 comprises an inner plate 11 and an outer plate 12. The molded frame 10 is essentially non-deforming and non-flexible, and is covered by the pivoting flap 4.

The pivoting flap 4 is fashioned as an energy-dissipating flexible hollow profile and, similar to the beam on the operator's side, comprises a relatively rigid inner plate 13 and an outer plate 14 which curves over the inner plate 13. The side of the outer plate 14 facing the passenger compartment is provided with a rigid expanded plastics layer 15.

The pivoting flap 4 is contoured on its outer, passenger compartment-facing side so as to be flush with the contour of the hollow beam on the operator's side when in the closed position. Thus, when the flap 4 is closed the impression created is that of a smooth, even knee-restraining element.

On the rear surface 19 of the inner plate 13 of the pivoting flap 4 (opposite the passenger compartment and below the instrument panel 1) there is fixed a trough-like container 16, which serves as a glove box, and which projects through the cut-out 9 of the hollow profiled beam. The container 16 has an approximately rectangular cross-section interior space 17 which can be filled through its top opening 18.

Figure 3:
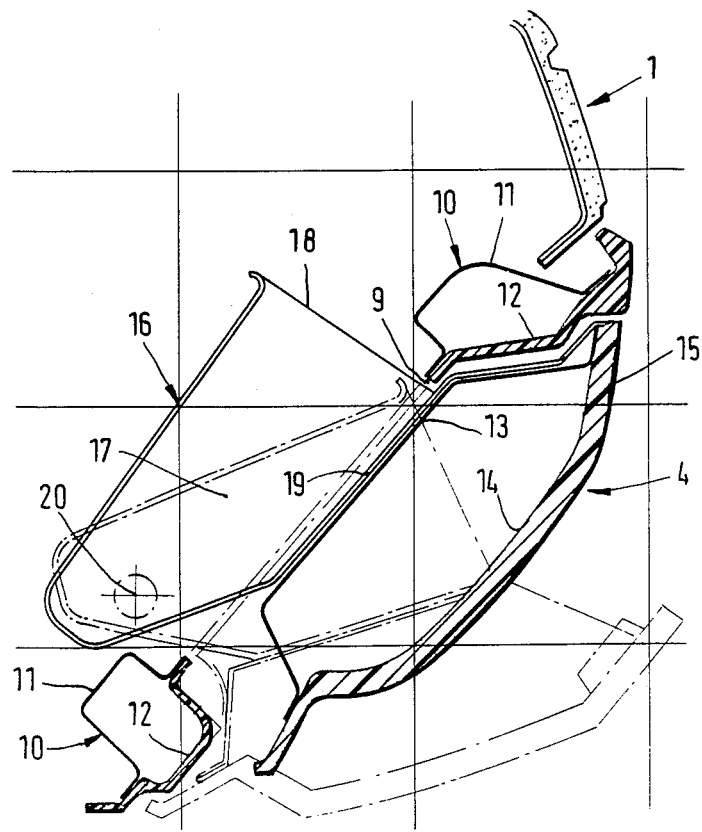
FIG. 3 is a cross-sectional view taken along the line III—III in FIG. 1.

The pivoting flap 4 pivots about an axis 20 which may be located in the bottom region of the container 16, and which runs in the longitudinal direction of the beam. FIG. 3 illustrates in solid lines the pivoting flap 4 and associated container 16 when in the closed position. In the open position, illustrated in dot-dash lines, the top opening 18 of the container 16 is readily accessible to the passenger.

If a load is placed on the pivoting flap 4 in the course of an emergency, the pivoting flap 4 is initially applied against the molded frame 10 and thereafter deforms and dissipates energy. Because the pivoting flap 4 bears against the frame 10, restraining forces transmitted into the knee-restraining element 2 are transmitted by way of its lateral suspension into the vehicle body.

The pivoting flap 4, and the container 16, may comprise steel or aluminum plate, although it will be appreciated that a suitable plastic may also be used. The inner and outer surfaces of the individual profiles may be joined by screw bolts, welding or riveting. Similarly, bolts, welding or riveting may be used to fix the container 16 to the wall 19 of the inner plate 13.

It will be appreciated by those skilled in the art that variations and modifications may be made to the exemplary embodiment described without departing from the spirit of the inventive concepts disclosed herein. All such variations and modifications are intended to fall within the scope of the appended claims.

We claim:

1. An energy-dissipating knee-restraining element for a vehicle having an instrument panel comprising a hollow profiled beam extending in the transverse direction of said vehilce, means forming a cut-out in said hollow profiled beam below the instrument panel approximately at the level of the knees of a passenger seated on the passenger side of the vehicle, rigid frame means surrounding said cut-out, the rigid frame means surrounding the cut-out comprising an inner plate and an outer plate, defining together a rigid hollow construction at edges of the cut-out in the hollow profiled beam, a pivoting flap means normally covering the cut-out fashioned as an energy-dissipating hollow profiled element, and a storage compartment means rigidly affixed to the pivoting flap means.

2. The knee-restraining element according to claim 1, wherein said pivoting flap means is pivotable about an axis arranged proximate a lower region of said cut-out, said axis extending in the longitudinal direction of said hollow profiled beam.

3. The knee-restraining element according to claim 2, wherein said storage compartment means is open on its upper end face and is fixed on a rear side of said pivoting flap means beneath said instrument panel.

4. The knee-restraining element according to any of claims 1-3, wherein the outer contour of said pivoting flap means facing a passenger is flush with the outer contour of said hollow profiled beam on an operator side of said vehicle.

5. A knee-restraining element according to claim 4, wherein said axis of said pivoting flap means extends in a bottom region of said storage compartment means.

* * * * *